US008880057B2

(12) United States Patent
Choi et al.

(10) Patent No.: US 8,880,057 B2
(45) Date of Patent: Nov. 4, 2014

(54) APPARATUS AND METHOD FOR DYNAMIC FREQUENCY ASSIGNMENT IN A WIRELESS COMMUNICATION SYSTEM (75) Inventors: Eun-Sun Choi, Gwacheon-si (KR); Byoung-Ha Yi, Seoul (KR); Ki-Young Han, Yongin-si (KR); In-Seok Hwang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1563 days.

(21) Appl. No.: 12/146,213

(22) Filed: Jun. 25, 2008

(65) Prior Publication Data
US 2009/0005108 A1   Jan. 1, 2009

(30) Foreign Application Priority Data
Jun. 27, 2007 (KR) .................. 10-2007-0063586

(51) Int. Cl.
| H04W 72/00 | (2009.01) |
| H04W 24/02 | (2009.01) |
| H04W 48/16 | (2009.01) |
| H04W 28/16 | (2009.01) |
| H04W 84/04 | (2009.01) |
| H04B 17/00 | (2006.01) |
| H04W 24/10 | (2009.01) |

(52) U.S. Cl.
CPC .............. *H04W 24/02* (2013.01); *H04W 48/16* (2013.01); *H04W 28/16* (2013.01); *H04W 84/047* (2013.01); *H04B 17/0077* (2013.01); *H04W 24/10* (2013.01); *H04B 17/0057* (2013.01)
USPC .......... 455/424; 455/446; 455/447; 455/452.1

(58) Field of Classification Search
CPC ................................................ H04W 72/0453
USPC .............................. 455/424, 446, 447, 452.1
See application file for complete search history.

(56) References Cited

U.S. PATENT DOCUMENTS

| 5,963,848 | A  | * | 10/1999 | D'Avello ..................... 455/62 |
| 6,032,045 | A  | * | 2/2000 | Mimura ....................... 455/446 |
| 6,389,275 | B1 | * | 5/2002 | Kawashima et al. ......... 455/336 |
| 6,654,612 | B1 | * | 11/2003 | Avidor et al. ................. 455/450 |
| 6,832,074 | B2 | * | 12/2004 | Borras-Chia et al. ...... 455/67.13 |
| 7,477,920 | B2 | * | 1/2009 | Scheinert et al. ............ 455/561 |
| 2002/0128014 | A1 | * | 9/2002 | Chen .......................... 455/447 |
| 2006/0073833 | A1 |  | 4/2006 | Hamalainen et al. |
| 2006/0281455 | A1 | * | 12/2006 | Hayasaka ................. 455/426.1 |
| 2008/0159236 | A1 | * | 7/2008 | Ch'ng et al. .................. 370/335 |

FOREIGN PATENT DOCUMENTS

| KR | 10-0584281 B1 | 6/2004 |
| KR | 10-0584281 B1 | 5/2006 |
| WO | 02/23819 A2 | 3/2002 |
| WO | 02/093839 A2 | 11/2002 |

* cited by examiner

*Primary Examiner* — Wen Huang
(74) *Attorney, Agent, or Firm* — Jefferson IP Law, LLP (57) ABSTRACT

An apparatus and method for dynamic frequency assignment to a low-power Base Station (BS) in a wireless communication system are provided. The method includes receiving a Received Signal Strength Indication (RSSI) measurement result for the whole Frequency Assignment (FA) and an available FA set of the BS from the BS newly entering a network, selecting an FA having a minimum RSSI among FAs included in the available FA set, and assigning the FA having the minimum RSSI to the BS.

26 Claims, 5 Drawing Sheets

APPARATUS AND METHOD FOR DYNAMIC FREQUENCY ASSIGNMENT IN A WIRELESS COMMUNICATION SYSTEM

PRIORITY

This application claims the benefit under 35 U.S.C. §119(a) of a Korean patent application filed in the Korean Intellectual Property Office on Jun. 27, 2007 and assigned Serial No. 2007-63586, the entire disclosure of which is hereby incorporated by reference.

BACKGROUND OF THE INVENTION

1. Field of the Invention

The present invention relates generally to a wireless communication system. More particularly, the present invention relates to an apparatus and method for dynamic frequency assignment to a low-power Base Station (BS) in a wireless communication system.

2. Description of the Related Art

Currently, a broadband wireless communication system is being considered to deploy more low-power BSs to complement a macro BS. The low-power BS refers to a home or Small Office Home Office (SOHO) base station that is installed in an area having a poor Quality of Service (QoS) because the area is out of the service coverage area of the macro BS or only receives a weak signal. The low-power BS includes a home or office BS and an enterprise BS. The low-power BS provides a portable Internet service to Mobile Stations (MSs) like the macro BS. However, the low-power BS has a feature of a low output, a low capacity, a low price, etc. optimized for a small-scale such as home or SOHO.

Because of the feature of the low output, the low capacity, the low price, etc. of the low-power BS, the number of low-power BSs being installed is increasing. With the increasing number of low-power BSs, there is a need for a continuous network optimization process suitable for frequent installation and removal of the low-power BSs. This need is immediately followed by the need for a function of automatic installation of the low-power BSs for reducing a cost of network setup and a demand for a system that can detect and adapt a change of installation of neighboring low-power BSs. In pursuit of a service provider's demand, the standardization of self organization is now in progress in a 3$^{rd}$ Generation Partnership Project (3GPP) Long Term Evolution (LTE).

For the low-power BSs having an automatic BS installation and automatic network optimization function to operate adaptively to an adjacent wireless environment during initial installation or operation, a function of dynamic frequency assignment is required. Because the same outdoor system continues to operate, the low-power BSs must take the outdoor system into consideration. Thus, there is a need for a frequency assignment method for minimizing an influence on outdoor BSs while being adaptive to an indoor BS environment and maximizing a system capacity.

SUMMARY OF THE INVENTION

An aspect of the present invention is to address at least the above-mentioned problems and/or disadvantages and to provide at least the advantages described below. Accordingly, one aspect of the present invention is to provide an apparatus and method for dynamic frequency assignment to a low-power Base Station (BS) in a wireless communication system.

Another aspect of the present invention is to provide an apparatus and method for assigning a frequency to minimize interference between the same frequencies of indoor/outdoor BSs when a low-power BS is installed and operated indoors in a wireless communication system.

The above aspects are achieved by providing an apparatus and method for dynamic frequency assignment in a wireless communication system.

According to one aspect of the present invention, a method for assigning a frequency to a Base Station (BS) in a BS management server of a wireless communication system is provided. The method includes receiving a Received Signal Strength Indication (RSSI) measurement result for the whole Frequency Assignment (FA) and an available FA set of the BS from the BS newly entering a network, selecting an FA having a minimum RSSI among FAs included in the available FA set, and assigning the FA having the minimum RSSI to the BS.

According to another aspect of the present invention, a method for deciding an available Frequency Assignment (FA) set in a Base Station (BS) of a wireless communication system is provided. The method includes measuring received power for the whole FA, selecting an FA having a minimum received power among the whole FA and including the selected FA in the available FA set, and additionally including, in the available FA set, FAs whose received power are less than a multiplication of the minimum received power by a threshold value, among remaining FAs other than the selected FA According to further another aspect of the present invention, a method for changing a frequency assigned to a Base Station (BS) in a BS management server of a wireless communication system is provided. The method includes setting a minimum power value by an arbitrary value, changing an Frequency Assignment (FA) assigned to one of all managed BSs into a different FA included in an available FA set of the BS, calculating a sum of received power for the same FA among FAs assigned to all the BSs, and storing current FA assignment states of all the BSs when the calculated sum of received power is less than the minimum power value.

According to yet another aspect of the present invention, an apparatus for assigning a frequency to a Base Station (BS) in a wireless communication system is provided. The apparatus includes a BS management server and a BS. The BS management server receives a Received Signal Strength Indication (RSSI) measurement result for the whole Frequency Assignment (FA) and an available FA set of the BS from the BS newly entering a network, selects an FA having a minimum RSSI among FAs included in the available FA set, and assigns the FA having the minimum RSSI to the BS. The BS measures received power and RSSI for the whole FA, creates the available FA set using the measured received power for the whole FA, and transmits the created available FA set and the RSSI measurement result for the whole FA to the BS management server.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions or constructions are omitted for clarity and conciseness.

An apparatus and method for dynamic frequency assignment to a low-power Base Station (BS) in a wireless communication system according to an exemplary embodiment of the present invention is described below.

Figure 1:
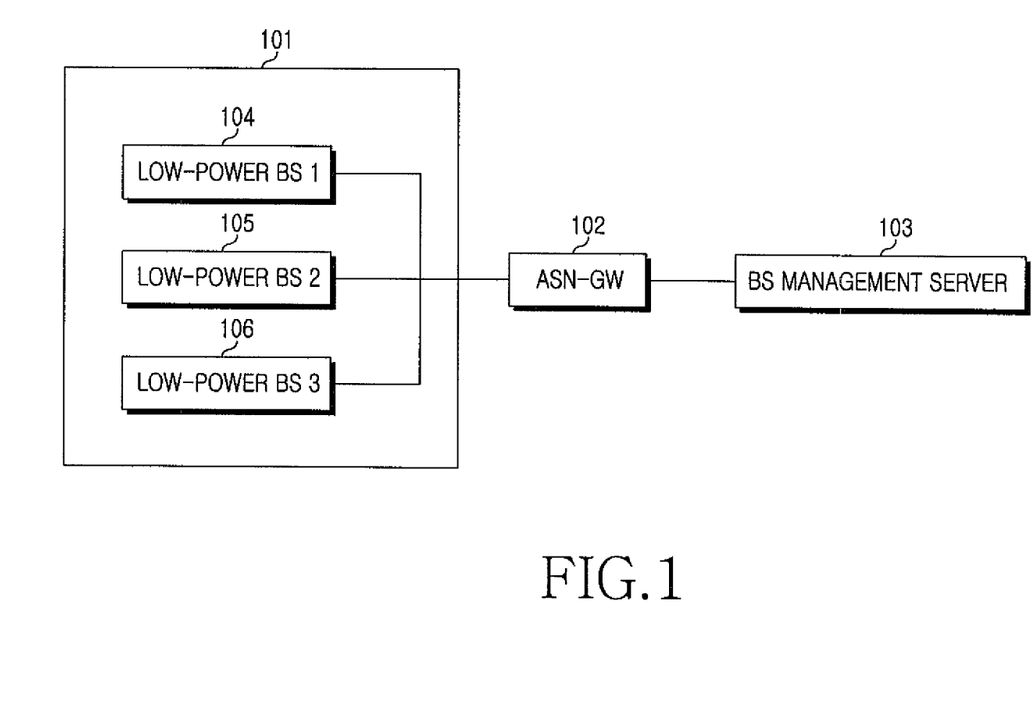
FIG. 1 is a block diagram illustrating a low-power Base Station (BS) network construction in an indoor environment according to an exemplary embodiment of the present invention.

FIG. 1 is a block diagram illustrating a low-power BS network construction in an indoor environment according to an exemplary embodiment of the present invention.

As shown in FIG. 1, the wireless communication system includes one or more low-power BSs 104, 105, and 106 located in the indoors 101, an Access Service Node Gateway (ASN-GW) 102 and a BS management server 103.

Referring to FIG. 1, when being powered on to enter a new network, the low-power BSs 104, 105 and 106 automatically perform an initial system setup such as an Internet Protocol (IP) setup, an authentication, a registration, and an image download through communications with the ASN-GW 102 and the BS management server 103. After that, the low-power BSs 104, 105 and 106 each are initially installed by measuring received power (Rx power) and Received Signal Strength Indication (RSSI) by a Frequency Assignment (FA) in response to a request of the BS management server 103, then selecting one or more FAs having low Rx power, deciding the selected FAs as an available FA set of the low-power BSs 104, 105 or 106, then transmitting the measurement result of Rx power and RSSI by an FA and the decided available FA set to the BS management server 103, and then receiving an FA assigned from the BS management server 103.

The ASN-GW 102 manages a connection and mobility of a mobile station (not shown).

The BS management server 103 supports the system setup such as the IP setup, the authentication, the registration, and the image download for all the low-power BSs 104, 105, and 106 within a network, and monitors and manages states of the low-power BSs 104, 105 and 106 that are operational. More particularly, when a new low-power BS enters the network, the BS management server 103 requests the low-power BS to transmit a measurement result of Rx power and RSSI by an FA and a decided available FA set. The BS management server 103 receives the measurement result and the decided available FA set, and assigns an FA having a minimum RSSI among the received available FA set to the low-power BS. The BS management server 103 periodically changes FAs of the low-power BSs 104, 105 and 106 so as to minimize interference between the same FA while operating the low-power BSs 104, 105 and 106.

Figure 2:
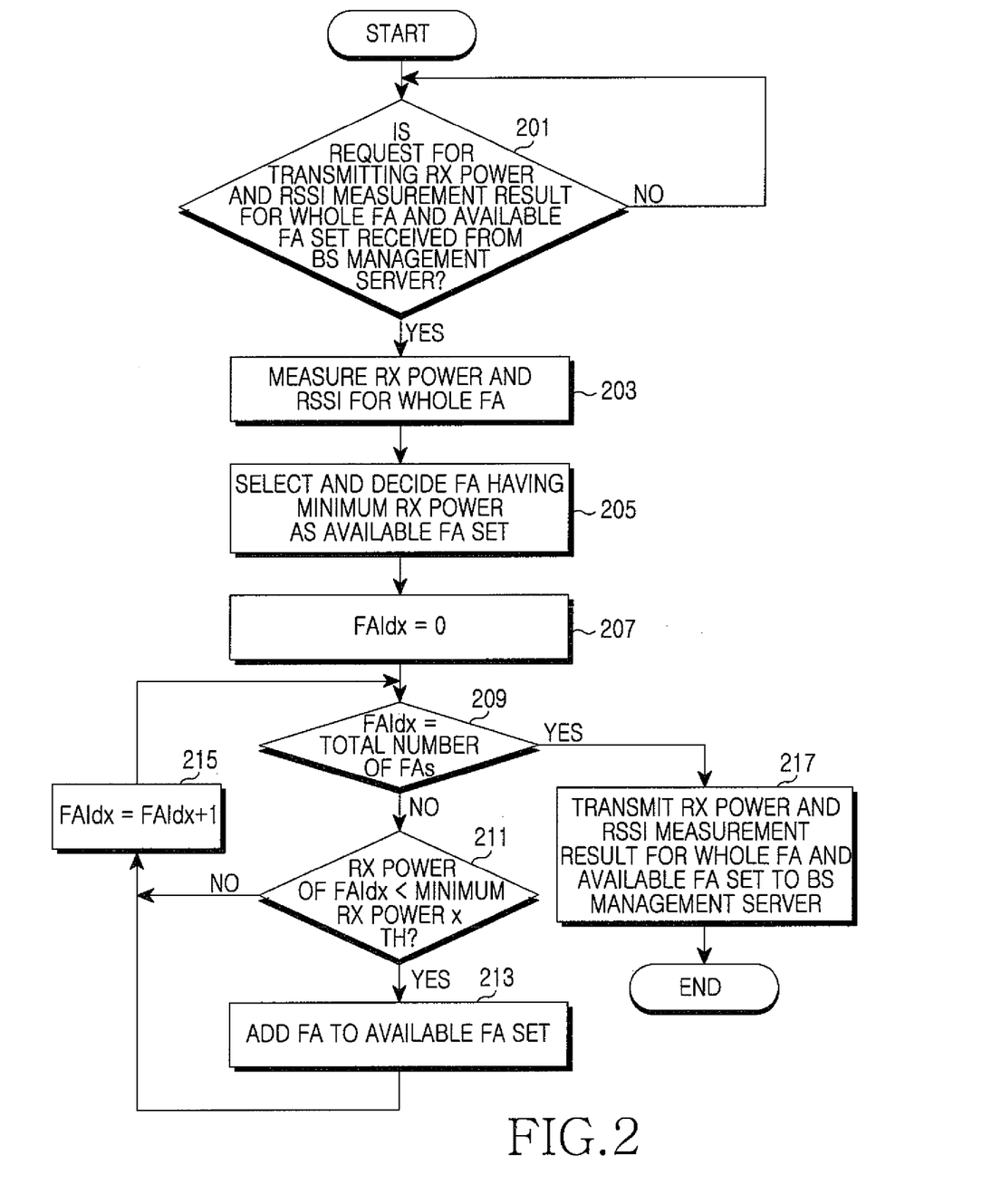
FIG. 2 is a flow diagram illustrating a process of deciding an available Frequency Assignment (FA) set in a low-power BS according to an exemplary embodiment of the present invention.

FIG. 2 is a flow diagram illustrating a process of deciding an available FA set in a low-power BS according to an exemplary embodiment of the present invention.

Referring to FIG. 2, a low-power BS determines whether it receives a request for transmitting a measurement result of Rx power and RSSI for the whole FA and an available FA set from a BS management server in step 201. If the request is received, the low-power BS measures Rx power and RSSI of a preamble signal having a corresponding FA for the whole FA in step 203. Otherwise, the low-power BS repeats step 201.

Then, the low-power BS selects an FA having a minimum Rx power among the whole FA and decides the selected FA as a first factor of the available FA set in step 205. Selecting an FA having the minimum Rx power means selecting an FA having the lowest maximum Rx power among FAs. This is to select FA applying the lowest interference to a macro/micro cell as an available FA set. Entry of a new low-power BS into an indoor environment can cause interference in the macro/micro cell and therefore, an available FA set has to be decided as FAs applying the lowest interferences to the macro/micro cell. For example, the low-power BS decides the highest Rx power among Rx power of preamble signals having an FA1 as a maximum Rx power of the FA1, decides maximum Rx power of remaining FAs in the same way, and selects an FA having the lowest maximum Rx power as the FA having the minimum Rx power.

Then, the low-power BS sets an FA Index (FAIdx) to "0" to decide one or more FAs satisfying a preset condition below among remaining FAs other than the selected FA as other factors of the available FA set in step 207. The low-power BS determines whether the FAIdx is equal to the total number of FAs that require a check on whether the preset condition is satisfied in step 209, that is, whether the FAIdx is equal to the number of the remaining FAs.

If the FAIdx is not equal to the total number of FAs in step 209, the low-power BS determines that a check for the remaining all FAs has not been made and then, in step 211, determines whether Rx power of the FAIdx is less than a multiplication of the minimum Rx power by a ThresHold value (TH). If the Rx power of the FAIdx is not less than the multiplication of the minimum Rx power by the TH, the low-power BS increases the FAIdx by one in step 215 and then, returns to step 209 and repeats step 209 and its subsequent steps. If the Rx power of the FAIdx is less than the multiplication of the minimum Rx power by the TH, the low-power BS adds an FA corresponding to the FAIdx as another factor of the available FA set in step 213 and proceeds to step 215.

If the FAIdx is equal to the total number of FAs in step 209, the low-power BS determines that a check for the remaining FAs has been completed and then, in step 217, transmits a measurement result of Rx power and RSSI for the whole FA and the decided available FA set to the BS management server.

Then, the low-power BS terminates the process of an exemplary embodiment of the present invention.

Figure 3:
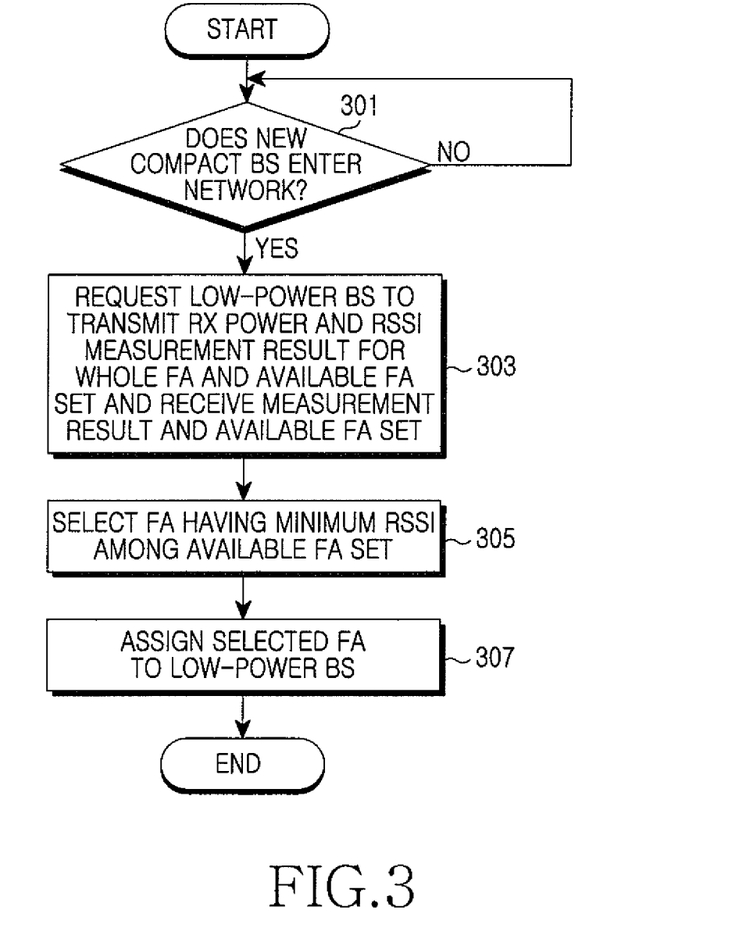
FIG. 3 is a flow diagram illustrating a process of dynamic frequency assignment in a BS management server when a low-power BS is initially installed according to an exemplary embodiment of the present invention.

FIG. 3 is a flow diagram illustrating a process of dynamic frequency assignment in a BS management server when a low-power BS is initially installed according to an exemplary embodiment of the present invention.

Referring to FIG. 3, a BS management server determines whether a new low-power BS enters a network in step 301. If the new low-power BS enters the network, in step 303, the BS management server requests the low-power BS to transmit a measurement result of Rx power and RSSI for all FAs and an available FA set and then receives the measurement result and the available FA set. Otherwise, the BS management server repeats step 301.

Then, in order to assign one FA among the available FA set to the low-power BS, the BS management server selects an FA having a minimum RSSI among the received available FA set in step 305. Then, the BS management server assigns the selected FA to the low-power BS in step 307 and then, terminates the process of an exemplary embodiment of the present invention.

Figure 4:
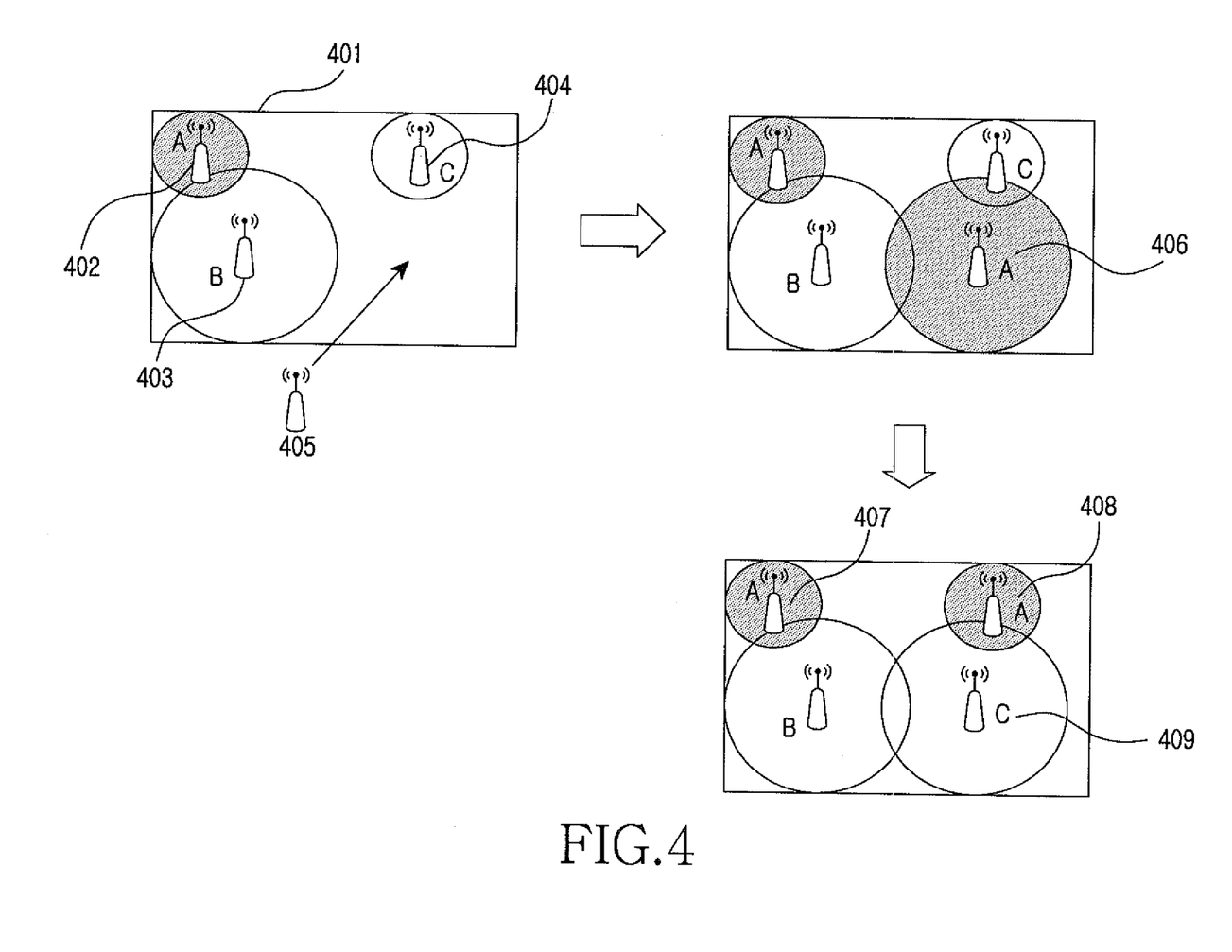
FIG. 4 is a diagram illustrating an example of a process of dynamic frequency assignment in a BS management server when a low-power BS is initially installed and operated according to an exemplary embodiment of the present invention.

For example, as shown in FIG. 4, when low-power BSs 402, 403, and 404 each are assigned FAs ('A', 'B', and 'C') and operated in a network 401 in an indoor environment, if a new low-power BS 405 enters the existing network 401, the new low-power BS 405 decides an available FA set using Rx power of each FA ('A', 'B', or 'C') and transmits the decided available FA set to a BS management server in response to a request of the BS management server. Then, the BS management server assigns an FA (e.g., 'A' 406) having a minimum RSSI among the received available FA set to the new low-power BS 405. In FIG. 4, a circle denotes Rx power corresponding to each low-power BS.

However, assigning an FA having a minimum RSSI among the available FA set to the new low-power BS is not the optimal condition. This is because, since the RSSI is information including a quantity of interference in addition to the same FA, the new low-power BS may actually cause a great influence of interference between the same FAs when the new low-power BS enters the network. Therefore, the BS management server has to change FAs of low-power BSs within a network in consideration of Rx power of an FA of each low-power BS to minimize interference between the same FAs. That is, for example of FIG. 4, when the new low-power BS 405 enters the network 401, the BS management server assigns an FA on the basis of Rx power and RSSI and then operates the new low-power BS 405 and low-power BSs 402 to 404 within the existing network 401 and while so, the BS management server can change FAs 408 and 409 of the low-power BSs 404 and 405 to minimize a sum of Rx power of the same FAs 406 and 407, that is, to minimize interference between the same FAs 406 and 407 on the basis of Rx power by an FA of the low-power BSs 402 to 405. By doing so, frequency assignment can be implemented to maximize a capacity of an indoor BS.

Figure 5:
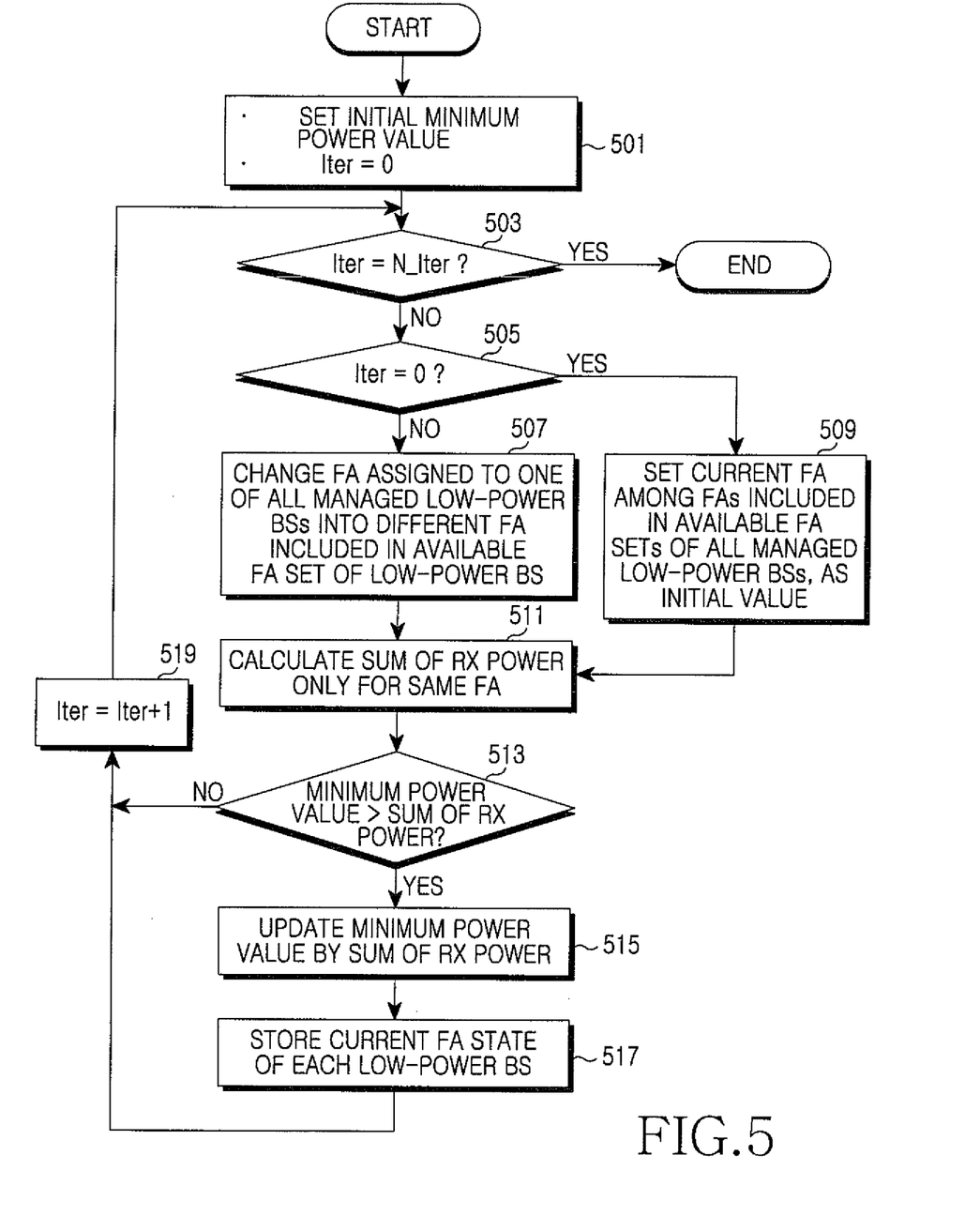
FIG. 5 is a flow diagram illustrating a process of changing dynamic frequency assignment in a BS management server when a low-power BS is operated according to an exemplary embodiment of the present invention.

FIG. 5 is a flow diagram illustrating a process of changing dynamic frequency assignment in a BS management server when a low-power BS is operated according to an exemplary embodiment of the present invention Referring to FIG. 5, a BS management server sets an initial minimum power value by an arbitrary value and initializes an Iteration number (Iter) by '0' in step 501. Then, the BS management server checks all managed low-power BSs as to whether the 'Iter' is equal to a number of FA change combinations (N_Iter) that can change an FA of a low-power BS into a different FA included in an available FA set of the low-power BS in step 503.

If the 'Iter' is not equal to the 'N_iter' in step 503, the BS management server determines whether the 'Iter' is equal to '0' in step 505. If the 'Iter' is equal to '0', the BS management server sets a currently assigned FA among FAs included in an available FA set as an initial FA value of a low-power BS, repeatedly for all managed low-power BSs, in step 509. Then, the BS management server calculates a sum of Rx power of only the same FAs in a currently FA assignment state in step 511. In contrast, if the 'Iter' is not equal to '0', the BS management server changes an FA assigned to one of all managed low-power BSs into a different FA included in an available FA set of the low-power BS in step 507 and then proceeds to step 511. In other words, the BS management server changes an FA currently assigned to an $i^{th}$ low-power BS within a network into a $j^{th}$ FA included in an available FA set of the $i^{th}$ low-power BS. This change process is repeatedly performed for all low-power BSs until it is attempted to change all FAs included in a corresponding available FA set one by one.

For example, when three low-power BSs exist and the low-power BSs each have available FA sets of (A, B, C), (C, B, D), and (A, B, D), a combination changing the FA of the low-power BS depending on the 'Iter' can be shown as in Table 1 below. The assumption is that a first FA included in an available FA set of a low-power BS is set as an FA assigned to the low-power BS, that is, as an initial FA value of the low-power BS.

TABLE 1

| Iter | Combination |
| --- | --- |
| 0 | A, C, A |
| 1 | B, C, A |
| 2 | C, C, A |
| 3 | A, B, A |
| 4 | B, B, A |
| 5 | C, B, A |
| 6 | A, D, A |
| 7 | B, D, A |
| 8 | C, D, A |
| 9 | A, C, B |
| 10 | B, C, B |
| 11 | C, C, B |
| 12 | A, B, B |
| 13 | B, B, B |
| 14 | C, B, B |
| 15 | A, D, B |
| 16 | B, D, B |
| ... | ... |

Then, the BS management server determines whether the calculated sum of Rx power is less than the minimum power value in step 513. If the calculated sum of Rx power is greater than or equal to the minimum power value, the BS management server updates the 'Iter' by one more value in step 519 and then, returns to step 503 and repeats step 503 and its subsequent steps. If the calculated sum of Rx power is less than the minimum power value, the BS management server updates the minimum power value by the sum of Rx power in step 515. Then, the BS management server stores a current FA assignment state of each low-power BS in step 517 and then, proceeds to step 519. That is, the 'N_iter' means a possible combination to calculate the sum of Rx power.

If the 'Iter' is equal to the 'N_iter' in step 503, the BS management server determines that it attempts to change FAs assigned to all managed low-power BSs into different FAs included in available FA sets of the low-power BSs one by one while assigning FAs to all the low-power BSs to minimize interference between the same FAs and then, terminates the process of an exemplary embodiment of the present invention. Steps 501 to 519 can be also performed either periodically or depending on event occurrence.

As described above, exemplary embodiments of the present invention have an advantage of being capable of minimizing influence on an outdoor BS while being adaptive to an indoor BS environment and maximizing a system capacity, by assigning a frequency to minimize interference between the same frequencies of indoor/outdoor BSs when a low-power BS is installed and operated in the indoors in a wireless communication system.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for assigning a frequency to a Base Station (BS) in a BS management server of a wireless communication system, the method comprising:
   requesting, via a message sent from the BS management server, the BS newly entering a network to transmit a Received Signal Strength Indication (RSSI) measurement result for a whole Frequency Assignment (FA) and an available FA set of the BS after the BS management server has detected the BS newly entering the network;
   receiving the RSSI measurement result for the whole FA and the available FA set of the BS from the BS newly entering the network after the BS newly entering the network has received the message from the BS management server;
   selecting an FA having a minimum RSSI among FAs included in the available FA set; and
   assigning the FA having the minimum RSSI to the BS,
   wherein the available FA set comprises at least one FA having a relatively lower maximum received power from among the whole FA.

2. The method of claim 1, wherein the BS comprises a low-power BS.

3. The method of claim 1, wherein the available FA set comprises an FA having a minimum received power among the whole FA and one or more FAs whose received power are less than a multiplication of the minimum received power by a threshold value.

4. A method for deciding an available Frequency Assignment (FA) set in a Base Station (BS) of a wireless communication system, the method comprising:
   receiving a message sent from the BS management server requesting the BS, upon newly entering a network, to transmit a Received Signal Strength Indication (RSSI) measurement result for a whole Frequency Assignment (FA) and an available FA set of the BS after the BS management server has detected the BS newly entering the network;
   measuring received power for the whole FA; and
   selecting an FA having a minimum received power among the whole FA and including the selected FA in the available FA set,
   wherein the available FA set comprises at least one FA having a relatively lower maximum received power from among the whole FA.

5. The method of claim 4, further comprising:
   transmitting the available FA set to a BS management server in response to the request from the BS management server.

6. The method of claim 4, wherein the BS comprises a low-power BS.

7. The method of claim 4, wherein the available FA set comprises FAs whose received power are less than a multiplication of the minimum received power by a threshold value, from among remaining FAs other than the selected FA.

8. A method for changing a frequency assigned to a Base Station (BS) in a BS management server of a wireless communication system, the method comprising:
   setting a minimum power value by an arbitrary value;
   changing Frequency Assignment (FA) assigned to one of all managed BSs into a different FA included in an available FA set of the BS;
   calculating a sum of received power for the same FA among FAs assigned to all the BSs; and
   storing current FA assignment states of all the BSs when the calculated sum of received power is less than the minimum power value,
   wherein each of the current FA assignment states indicate a respective FA that is assigned to each of the BSs.

9. The method of claim 8, further comprising:
   receiving a received power measurement result for the whole FA and an available FA set from all the BSs.

10. The method of claim 8, further comprising:
    updating the minimum power value by the calculated sum of received power when the calculated sum of received power is less than the minimum power value.

11. The method of claim 8, wherein the BS comprises a low-power BS.

12. The method of claim 8, wherein the available FA set comprises an FA having a minimum received power among the whole FA and one or more FAs whose received power are less than a multiplication of the minimum received power by a threshold value.

13. An apparatus for assigning a frequency to a Base Station (BS) in a wireless communication system, the apparatus comprising:
    a BS management server for transmitting a message to a BS newly entering a network requesting the BS to transmit a Received Signal Strength Indication (RSSI) measurement result for a whole Frequency Assignment (FA) and an available FA set of the BS after the BS management server has detected the BS newly entering the network, for receiving the RSSI measurement result for the whole FA and the available FA set of the BS from the BS newly entering the network after the BS newly entering the network has received the message from the BS management server, for selecting an FA having a minimum RSSI among FAs included in the available FA set, and for assigning the FA having the minimum RSSI to the BS; and
    the BS for measuring received power and RSSI for the whole FA, for creating the available FA set using the measured received power for the whole FA, and for transmitting the created available FA set and the RSSI measurement result for the whole FA to the BS management server,
    wherein the available FA set comprises at least one FA having a relatively lower maximum received power from among the whole FA.

14. The apparatus of claim 13, wherein the BS management server requests the BS newly entering the network to transmit an RSSI measurement result for the whole FA and an available FA set of the BS.

15. The apparatus of claim 13, wherein the BS comprises a low-power BS.

16. The apparatus of claim 13, wherein the BS creates the available FA set including an FA having a minimum received power among the whole FA and one or more FAs whose received power are less than a multiplication of the minimum received power by a threshold value.

17. The apparatus of claim 13, wherein the BS transmits received power for the whole FA together with the created available FA set and the RSSI measurement result for the whole FA to the BS management server.

18. The apparatus of claim 17, wherein the BS management server sets a minimum power value by an arbitrary value, changes an FA assigned to one of all managed BSs into a different FA included in an available FA set of the BS, calculates a sum of received power for the same FA among FAs assigned to all BSs, and stores current FA assignment states of all the BS when the calculated sum of received power is less than the minimum power value.

19. The apparatus of claim 18, wherein the BS management server updates the minimum power value by the calculated sum of received power when the calculated sum of received power is less than the minimum power value.

20. An apparatus for transmitting an available Frequency Assignment (FA) set in a Base Station (BS) of a wireless communication system, the apparatus comprising:
    a BS management server for requesting a BS newly entering a network to transmit the available FA set; and
    a BS for measuring received power for the whole FA in response to the request of the BS management server, for selecting an FA having a minimum received power among the whole FA, for including the selected FA in the available FA set, and for transmitting the available FA set to the BS management server,
    wherein the available FA set comprises at least one FA having a relatively lower maximum received power from among the whole FA.

21. The apparatus of claim 20, wherein the BS comprises a low-power BS.

22. The apparatus of claim 20, wherein the BS selects, as the available FA set, FAs whose received power are less than a multiplication of the minimum received power by a threshold value, from among remaining FAs other than the selected FA.

23. An apparatus for changing a frequency assigned to a Base Station (BS) in a wireless communication system, the apparatus comprising:
    a BS management server for receiving received power for the whole FA and an available Frequency Assignment (FA) set from all managed BSs, for setting a minimum power value by an arbitrary value, for changing an FA assigned to one of the BSs into a different FA included in an available FA set of the BS, for calculating a sum of received power for the same FA among FAs assigned to all the BSs, and for storing current FA assignment states of all the BSs when the calculated sum of received power is less than the minimum power value; and
    the BS for measuring received power for the whole FA, for creating the available FA set using the measured received power for the whole FA, and for transmitting the created available FA set and the received power for the whole FA to the BS management server,
    wherein each of the current FA assignments states indicate a respective FA that is assigned to each of the BSs.

24. The apparatus of claim 23, wherein the BS management server updates the minimum power value by the calculated sum of received power when the calculated sum of received power is less than the minimum power value.

25. The apparatus of claim 23, wherein the BS comprises a low-power BS.

26. The apparatus of claim 23, wherein the BS creates the available FA set as an FA having a minimum received power among the whole FA and one or more FAs whose received power are less than a multiplication of the minimum received power by a threshold value.

* * * * *